United States Patent
Nath et al.

(10) Patent No.: US 8,413,138 B2
(45) Date of Patent: Apr. 2, 2013

(54) SYSTEM AND METHOD TO SECURELY LOAD A MANAGEMENT CLIENT FROM A STUB CLIENT TO FACILITATE REMOTE DEVICE MANAGEMENT

(75) Inventors: Badri Nath, Edison, NJ (US); Rakesh Kushwaha, Marlboro, NJ (US); Amit Shah, Piscataway, NJ (US); Srinivas Devarakonda, Keasbey, NJ (US)

(73) Assignee: Mformation Software Technologies, Inc., Edison, NJ (US)

( * ) Notice: Subject to any disclaimer, the term of this patent is extended or adjusted under 35 U.S.C. 154(b) by 922 days.

(21) Appl. No.: 12/026,807

(22) Filed: Feb. 6, 2008

(65) Prior Publication Data

US 2009/0199176 A1    Aug. 6, 2009

(51) Int. Cl.
  *G06F 9/445*  (2006.01)
  *G06F 9/44*   (2006.01)
  *G06F 15/16*  (2006.01)
  *G06F 15/177* (2006.01)
  *G06F 9/00*   (2006.01)
  *G06F 9/46*   (2006.01)
  *G06F 7/04*   (2006.01)

(52) U.S. Cl. ........ 717/178; 717/168; 717/171; 717/174; 709/204; 709/217; 709/220; 709/227; 709/236; 713/1; 713/159; 713/171; 718/100; 726/7; 726/29

(58) Field of Classification Search .................. None
See application file for complete search history.

(56) References Cited

U.S. PATENT DOCUMENTS

| | | | | |
|---|---|---|---|---|
| 6,832,373 B2 * | 12/2004 | O'Neill | ............... | 717/171 |
| 7,634,651 B1 * | 12/2009 | Gerde et al. | ............... | 713/153 |
| 7,685,253 B1 * | 3/2010 | Valia | ............... | 709/217 |
| 7,805,719 B2 * | 9/2010 | O'Neill | ............... | 717/168 |
| 2003/0065738 A1 * | 4/2003 | Yang et al. | ............... | 709/215 |
| 2003/0066065 A1 * | 4/2003 | Larkin | ............... | 717/177 |
| 2003/0101246 A1 * | 5/2003 | Lahti | ............... | 709/221 |
| 2003/0204726 A1 * | 10/2003 | Kefford et al. | ............... | 713/171 |

(Continued)

FOREIGN PATENT DOCUMENTS

| EP | 1 429 569 A1 | 6/2004 |
|---|---|---|
| WO | 2005001665 A2 | 1/2005 |

OTHER PUBLICATIONS

Erno Kovacs et al.,Integrating Mobile Agents into the Mobile Middleware, 1998 Springer, [Retrieved on Nov. 26, 2012]. Retrieved from the internet: <URL: http://download.springer.com/static/pdf/630/art%253A10.1007%252FBF01324936.pdf?auth66=1353975026_642152af85f26d0903f4dc786bdf1416&ext=.pdf> 7 Pages (68-74).*

(Continued)

*Primary Examiner* — Don Wong
*Assistant Examiner* — Anibal Rivera
(74) *Attorney, Agent, or Firm* — Brosemer, Kolefas & Assoc., LLC

(57) ABSTRACT

Systems and methods are described for securely downloading management client software onto a device from an embedded stub in the device. In one embodiment, the stub client is activated by a message with credentials from a management server. The stub client, after verification of the credentials, downloads and activates a full management client. The management client then participates in any authorized management session with the device management server. The messages are preferably encrypted using a key that is based on the credentials. The credentials may be specific to the device and to the service provider associated with the device.

15 Claims, 4 Drawing Sheets

U.S. PATENT DOCUMENTS

| | | | |
|---|---|---|---|
| 2004/0010579 A1* | 1/2004 | Freese | 709/223 |
| 2004/0098715 A1* | 5/2004 | Aghera et al. | 717/173 |
| 2004/0117785 A1* | 6/2004 | Kincaid | 717/170 |
| 2005/0132359 A1* | 6/2005 | McGuire et al. | 717/175 |
| 2005/0154759 A1* | 7/2005 | Hofmeister et al. | 707/104.1 |
| 2005/0193098 A1* | 9/2005 | Khandpur et al. | 709/220 |
| 2006/0015404 A1* | 1/2006 | Tran | 705/14 |
| 2006/0015626 A1* | 1/2006 | Hallamaa et al. | 709/229 |
| 2006/0075284 A1* | 4/2006 | Skan | 714/5 |
| 2006/0130046 A1* | 6/2006 | O'Neill | 717/168 |
| 2006/0136922 A1* | 6/2006 | Zimberg et al. | 718/100 |
| 2006/0168578 A1* | 7/2006 | Vorlicek | 717/168 |
| 2006/0236325 A1* | 10/2006 | Rao et al. | 719/315 |
| 2006/0248522 A1* | 11/2006 | Lakshminarayanan et al. | 717/174 |
| 2007/0005647 A1* | 1/2007 | Cugi et al. | 707/104.1 |
| 2007/0106564 A1* | 5/2007 | Matotek et al. | 705/26 |
| 2007/0299940 A1* | 12/2007 | Gbadegesin et al. | 709/220 |
| 2008/0098380 A1* | 4/2008 | Klusmeyer | 717/168 |
| 2008/0172736 A1* | 7/2008 | Barr et al. | 717/178 |
| 2008/0209193 A1* | 8/2008 | Zhang et al. | 713/1 |
| 2009/0164602 A1* | 6/2009 | Kies et al. | 709/217 |
| 2009/0177882 A1* | 7/2009 | Saran et al. | 713/159 |
| 2009/0221307 A1* | 9/2009 | Wolak et al. | 709/204 |
| 2009/0228966 A1* | 9/2009 | Parfene et al. | 726/7 |
| 2010/0070649 A1* | 3/2010 | Ng | 709/236 |
| 2010/0151823 A1* | 6/2010 | Dagorn et al. | 726/29 |
| 2010/0217780 A1* | 8/2010 | Erola et al. | 709/227 |

OTHER PUBLICATIONS

Mauro Caporuscio et al., Design and Evaluation of a Support Service for Mobile, Wireless Publish/Subscribe Applications, 2003 IEEE, vol. 29 No. 12, [Retrieved on Nov. 26, 2012]. Retrieved from the internet: <URL: http://ieeexplore.ieee.org/stamp/stamp.jsp?tp=&arnumber=1265521> 13 Pages (1059-1071).*

SyncML Initiative, SyncML Notification Initiated Session, Ver. 1.1, Feb. 15, 2002, pp. 1-12.

European Patent Office (EPO) as ISA, International Search Report and The Written Opinion of the International Searching Authority, International Patent Application No. PCT/US2008/060053, Feb. 9, 2009.

Response to Written Opinion of the IPEA, International Patent Application No. PCT/US2008/060053, Dec. 1, 2009.

USPTO as IPEA, International Preliminary Report on Patentability, International Patent Application No. PCT/US2008/060053, Dec. 20, 2011.

EPO, Communication Pursuant to Article 94(3) EPC, Oct. 13, 2011.

Response to Article 94 Communication, Feb. 13, 2012.

* cited by examiner

SYSTEM AND METHOD TO SECURELY LOAD A MANAGEMENT CLIENT FROM A STUB CLIENT TO FACILITATE REMOTE DEVICE MANAGEMENT

FIELD OF THE INVENTION

The present invention relates to the remote management of devices, particularly to securely loading management client software onto a device to be remotely managed.

BACKGROUND INFORMATION

The remote management of devices typically requires that device management client software be deployed on the devices that are to be remotely managed. The management client receives commands from an authorized management server and executes any actions dictated by the commands. Such actions may include, for example, configuration, software update, diagnostics, application management and other actions deemed necessary to provide services for the user using the device. The management client is also instrumental in establishing a remote session with the management server. The management client can be based on standards such as Open Mobile alliance (OMA-DM), TR-69, or DOCSIS, among others, or on proprietary standards.

For a remote management session with a device to take place, the device management client needs to be resident and activated on the device. The device management client can be pre-loaded onto the device at the time of manufacture with device-specific features as well as specific functionality desired by the entity providing communications service (i.e., the "service provider") for the device. This approach, however, has several shortcomings. First, a pre-loaded client may never be activated and as such would represent an unnecessary cost if never used. Second, significant time may elapse from the time the device is manufactured until the time that it is actually in the hands of the user, during which time a newer version of the management client may become available. This would require an update of the management client.

Another approach requires the device user to download the management client, either upon receiving a message from an authorized server and entering verifiable credentials, or by directly downloading the management client from a server. In either case, this method of downloading a management client requires user action.

Thus, there is a need to automatically download a management client with no user intervention at the time the device is activated in the network.

SUMMARY OF THE INVENTION

In an exemplary embodiment, the present invention provides a stub client to automatically download a full management client onto a device. The stub client is a software application, preferably having a small footprint, which is used to download a full management client onto a device. Once downloaded and running, the full management client allows an authorized management server to remotely manage the device. The stub client may reside on the device, on a SIM card, or on a smart card that can be inserted into the device.

In an exemplary embodiment of the present invention, a stub client of a device can be invoked remotely by sending a message with appropriate credentials to the device. The stub client, upon verifying the credentials, establishes a connection with a download server and downloads the full management client.

In an exemplary embodiment, the credentials for activating the stub client are based on the identity of the device and a signature of the service provider that will be managing the device. Using the identity of the device ensures that the management client downloaded is specific for that device and that the stub client is activated only when the proper activation message, as described above, reaches the device. Using the signature of the service provider ensures that the device downloads a management client when an activation message is received that is specific to the service provider. This prevents the stub client from being activated from some other service provider whose credentials do not match those expected by the stub client.

In an exemplary embodiment of the present invention, the stub client is dormant on the device and is activated only when a proper activation message directed to it is received at the device. This obviates the need for the stub client to periodically check with the management server to determine whether to download a management client.

In a further exemplary embodiment, when activated by a message from the management server, the stub client checks to determine if there already exists a management client active on the device. If such a management client exists, the stub client exits and takes no further action.

The above and other aspects and features of the present invention will be apparent from the drawings and detailed description which follow.

DETAILED DESCRIPTION

Figure 1:
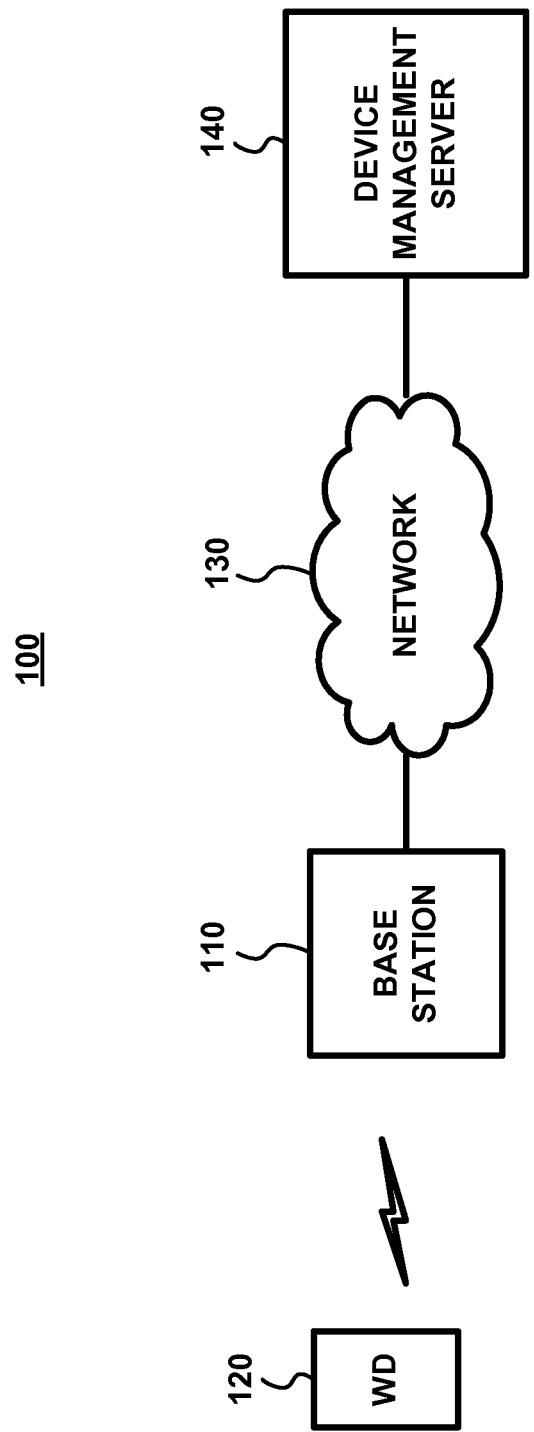
FIG. 1 is a block diagram of an exemplary wireless communications network for use with the present invention.

FIG. 1 is a block diagram of an exemplary wireless network 100 for use with the present invention. The network 100 comprises a conventional radio access network with one or more base stations or wireless access points 110 that can communicate with one or more wireless devices 120. The base stations 110 are coupled to a backbone network 130 connected to one or more servers, such as a device management server 140. The base station 110, device management server 140, and at least portions of the network 130 are typically operated, owned, or controlled by a service provider, or similar entity.

The wireless technology employed by the network 100 can be any of the schemes available to communicate wirelessly with a device, including, for example, code division multiple access (CDMA), general packet radio service (GPRS), WiFi, WiMax, universal mobile telecommunications system (UMTS), and long term evolution (LTE), among others.

The present invention can be applied to any arrangement in which devices are to be managed remotely from a management server. In so doing, the management server 140 initiates certain actions that will result in messages sent to a client on the device 120. The client on the device can effect changes to the device based on management commands sent from the server 140. Management commands may include, for example, configuration, software management, diagnostics, and security commands, among others. The client/server interaction may follow any of a variety of known standards, such as the Open Mobile Alliance device management, TR-69 of the DSL forum, or DOCSIS of Cablelabs, or it may follow a proprietary protocol.

In an exemplary embodiment of the present invention, a stub client, an application preferably having a very small footprint, or memory requirement, is used to download a full management client onto the device 120. Once downloaded and running, the full management client allows the device management server 140 to remotely manage the device.

The stub client may reside on the device, on a SIM card, or on a smart card that can be inserted into the device. The stub client lies dormant on the device and wakes up when the device receives an activation message directed to the stub client. The message can be sent using any of the available bearers such as short messaging service (SMS) or internet protocol (IP).

Because the stub client lies dormant until it is activated, it does not impact the usability of the device until the appropriate message is sent to invoke the stub client. The stub client also provides the ability to automatically download and install the device management client silently, without subscriber interaction. Further, the stub client does not perform periodic polling of the device manager and therefore should not cause the device to consume any significant amount of power while the stub client is dormant.

Advantageously, the small footprint and well-defined limited functionality of the stub client allows its design to be readily finalized and frozen. This allows for fast acceptance by device manufacturers who can install the stub client onto devices well before the design of the fully functional management client has been defined and frozen.

The exemplary stub client need only know how to process the activation message, verify the credentials contained in the activation message, decrypt the message, and download the management client from the server specified in the message. In a further exemplary embodiment, the stub client can check to determine if a management client is already active on the device and if so, exit before downloading another management client.

Figure 2:
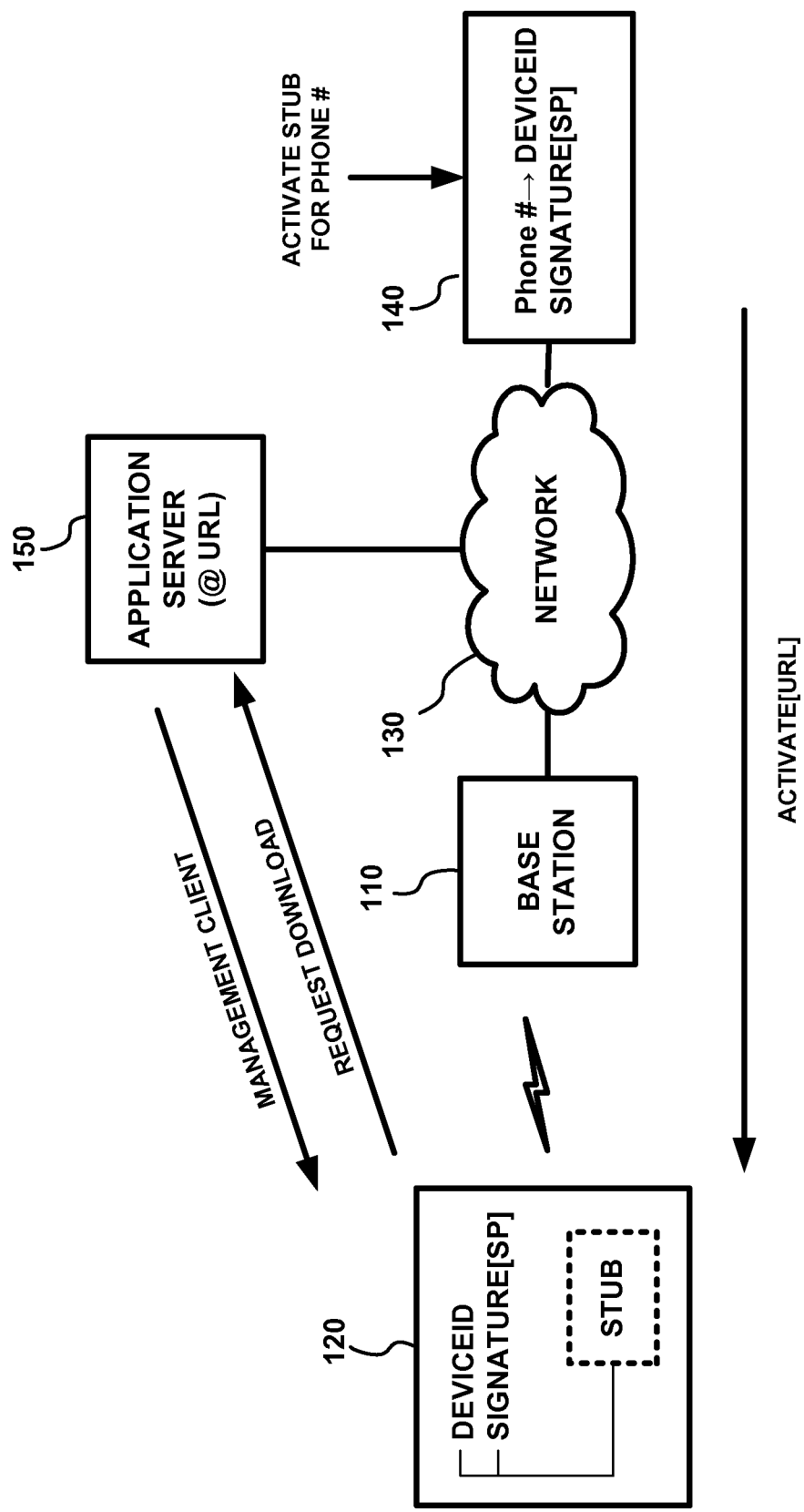
FIG. 2 is a block diagram illustrating the exchange of messages between a device management server and a stub client on a device, in accordance with an exemplary embodiment of the present invention.

FIG. 2 illustrates the exchange of messages between the device management server 140 and the stub client on the device 120, in accordance with an exemplary embodiment of the present invention. At some point, an external entity, a business process, or the like, will indicate to the management server 140 the need to activate the stub client on a device 120. The device indicated by the external system can be identified based on some externally known identifier such as the customer identifier or the phone number assigned to the device, such as the mobile subscriber ISDN number (MSISDN). The management server 140 maintains a mapping between the external identifier and a device identifier such as, for example, the electronic serial number (ESN), mobile equipment identifier (MEID), international mobile equipment identity (IMEI), stock keeping unit (SKU) number, or media access control (MAC) address of the device.

The activation message sent from the management server 140 to the stub client is preferably an encrypted text message that can be decrypted by the stub client using a key based on information known to the stub client. Such information may include, for example, a device identifier and a service provider signature, which can be stored in the device. The activation message may contain the location of a server from which the stub client can download the management client. In alternative embodiments, the stub client knows the location of the download server a priori, or the management server 140 can act as the management client download server. It is preferred, however, that the location of the download server be specified in the activation message to allow for greater flexibility.

The management server 140 constructs an encryption key from the device identifier and a signature associated with the service provider (SP) and uses the key to encrypt the activation message before sending it to the device. The encrypted activation message contains information about where to find the management client to be downloaded to the device 120, such as the URL of an application server 150, from which the management client can be downloaded. Upon receiving the activation message, the stub client on the device 120 uses the device identifier and the service provider signature stored in the device to construct a decryption key, decrypts the message using the key, connects to the server located per the URL contained in the message, and downloads the management client from the specified server.

Figure 3:
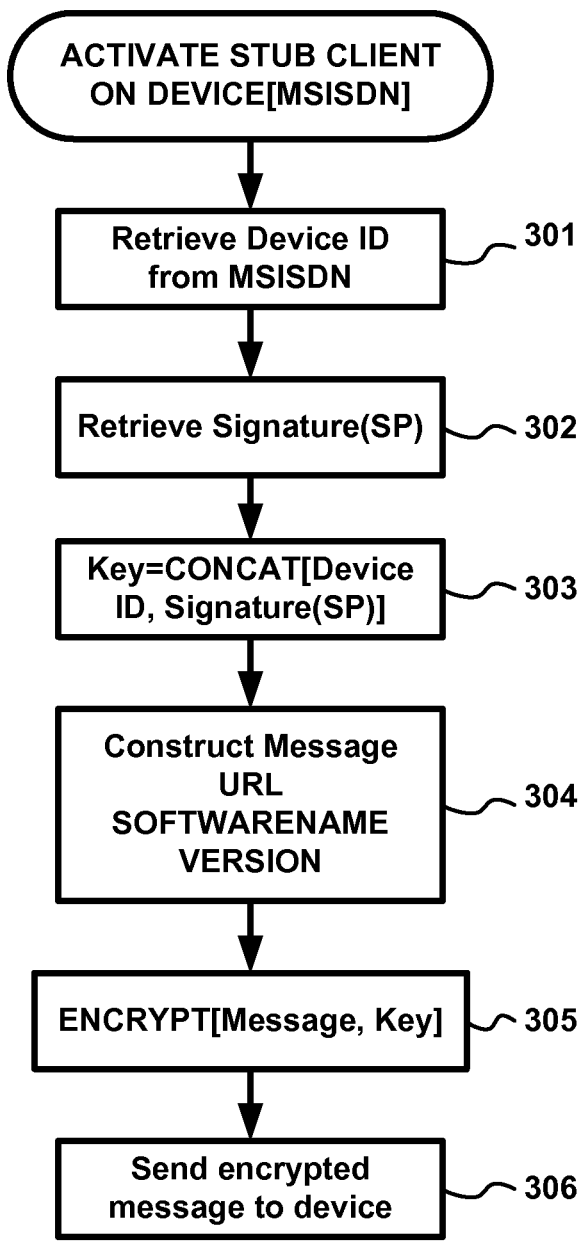
FIG. 3 is a flow chart of an exemplary embodiment of a method used by a management server to generate a key from a device identifier, and then using the key to encrypt the message sent to the device.

FIG. 3 is a flow chart of an exemplary embodiment of a method of activating the stub client on a device from a management server. In the exemplary method shown, the device is identified to the management server with the telephone number (e.g., MSISDN) assigned to the device. Using the MSISDN, the device identifier (e.g., ESN, MEID, IMEI, or the like) of the device is retrieved at 301. At 302, the management server retrieves the signature of the service provider (SP) associated with the device having the device identifier retrieved at 301. The device identifier is known to the service provider, and is used primarily during subscriber authentication. The signature is unique to the service provider and is programmed into the devices associated with that service provider.

At 303, using the device identifier and the service provider signature, the management server generates an encryption key. In the exemplary embodiment, the key is generated by concatenating the device identifier (retrieved at 301) and the SP signature (retrieved at 302), although other techniques for generating the key from these parameters can be used as well.

At 304, the management client activation message to be sent to the device is constructed. The message contains information relating to the management client software that the client stub on the device is to obtain and install on the device. Such information, may include, for example: the URL of the network location from which the device is to obtain the management client software; the name or some appropriate designation of the client software (e.g., SOFTWARENAME); and the version number of the client software (e.g., VERSION). The message may also include credentials, a security code, or the like, that the device must present to the application server before the server will provide the device with the management client software.

At 305, the management client activation message is encrypted using the key generated above, and at 306, the encrypted message is sent to the device. In the exemplary embodiment shown, the encrypted message is sent using SMS addressed to the phone number assigned to the device, or other messaging schemes such as user datagram protocol (UDP) or transmission control protocol (TCP) addressed to the IP address assigned to the device.

Figure 4:
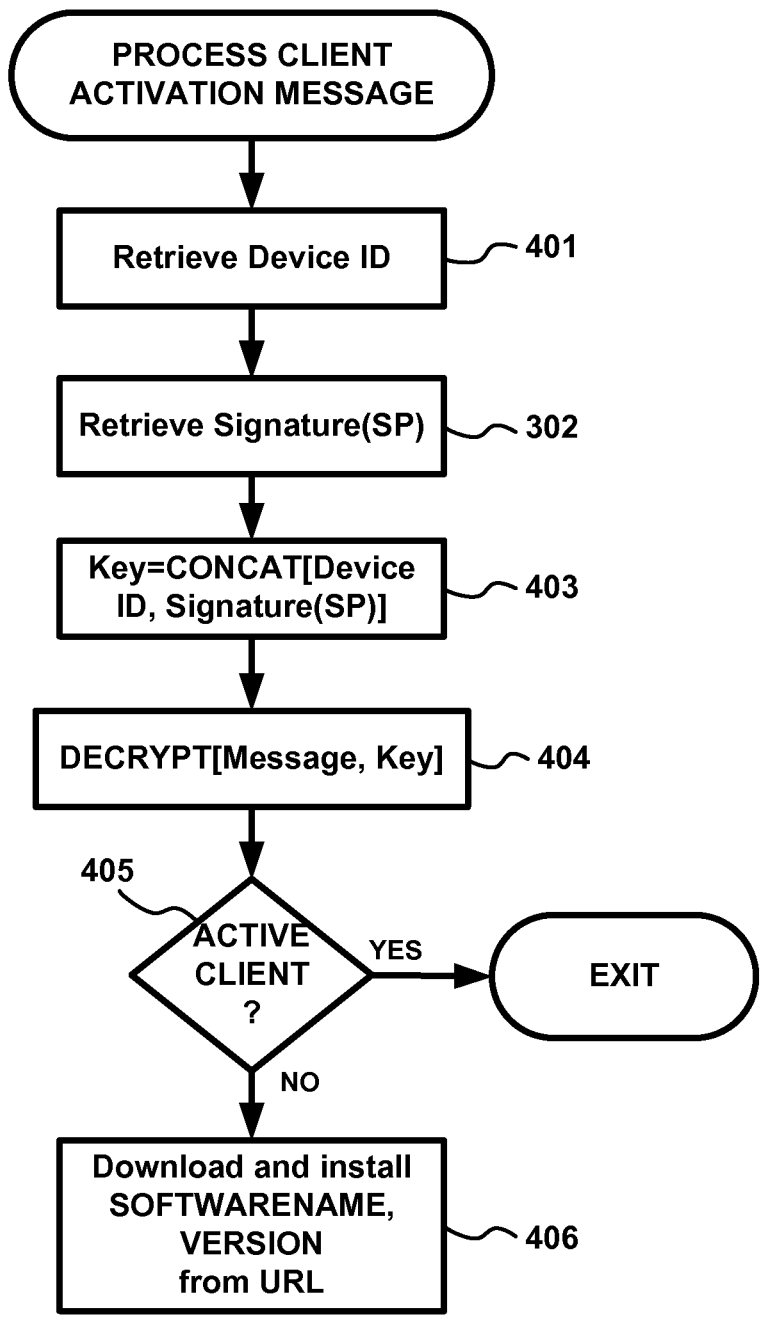
FIG. 4 is a flow chart of an exemplary embodiment of a method used by a device to decrypt a message from a management server and to download a management client from a URL specified in the message.

FIG. 4 is a flow chart of an exemplary embodiment of a method used by a device to decrypt a management client activation message received from a management server and to download a management client from a URL specified in the message. As discussed above, before the management client on a device is downloaded and installed, a stub client is resident on the device. When a message is received at the device for the stub client which is identified by the header of the SMS message or an IP message, such as generated with the exemplary method of FIG. 3, the stub client will be awakened or activated and will proceed in accordance with the method of FIG. 4.

At 401, the stub client will retrieve the device identifier (e.g., ESN, MEID, IMEI, or the like) of the device, which is typically stored in the device, such as in flash memory or the like. At 402, the stub client will also retrieve the service provider signature, which is also stored in the device. At 403, the stub client constructs the key for decrypting the activation message. The key is constructed from the device identifier and the service provider signature using the same algorithm used by the management server for constructing the key used to encrypt the message. Alternatively, since the device identifier and service provider signature are known a priori, the key corresponding to those parameters can be stored in the device and retrieved by the stub client, as opposed to constructing the key from the device identifier and service provider signature. At 404, the stub client uses the key to decrypt the message.

Once the stub client has decrypted the message and determined that it is a proper management client activation message, the stub client determines at 405 whether there is a management client already active on the device. If there is, the stub client exits with no further action. If no such client is present, however, the stub client at 406 connects to the server at the URL contained in the message and downloads and installs the software application identified in the message, namely the management client. As mentioned above, additional security measures may be included whereby the device presents certain credentials to the application server before the application server provides the management client software to the device. Once the management client is installed on the device, it takes over the management functions of the device and the stub client is de-activated.

In an exemplary embodiment, the stub client may include a "retry" mechanism if the above-described procedure does not result in the successful installation of the management client. The stub client will attempt to establish a connection to the download server and attempt to download the management client software, at least one more time. After a failure, subsequent attempts may be made after a retry interval, which may change with the number of attempts made. After a number of such attempts, the stub client may stop processing the activation message and go back to its initial state (e.g., dormant). If a new activation message is received, the stub client may perform the above-described procedure of FIG. 4.

Note that the above-described processes of the present invention can be carried out with or without user intervention.

It is understood that the above-described embodiments are illustrative of only a few of the possible specific embodiments which can represent applications of the present invention. Numerous and varied other arrangements can be made by those skilled in the art without departing from the spirit and scope of the invention.

What is claimed is:

1. A method of downloading an application onto a remotely managed mobile wireless device comprising:

receiving, at the remotely managed mobile wireless device, an activate message with credentials from a device management server, verifying, at the remotely managed mobile wireless device, the credentials in the activate message so as to authenticate the activate message to the mobile wireless device;

responsive to authenticating the activate message, communicating with a download server; and downloading the application from the download server onto the remotely managed mobile wireless device, wherein the verifying and downloading steps are carried out with a stub application on the remotely managed mobile wireless device and the application is a device management client application.

2. The method of claim 1, wherein the method is carried out without user interaction.

3. The method of claim 1, wherein the stub application is resident and dormant on the remotely managed mobile wireless device and is activated as a result of receiving the activate message at the remotely managed mobile wireless device.

4. The method of claim 1, wherein the activate message includes a location of the download server.

5. The method of claim 1, wherein the credentials include service provider specific information so that a service provider specific application is downloaded.

6. The method of claim 1, wherein the credentials include device specific information so that a device specific application is downloaded.

7. The method of claim 6, wherein the device specific information includes an identifier uniquely associated with the remotely managed mobile wireless device.

8. The method of claim 1 comprising determining whether a device management client application is on the remotely managed mobile wireless device before downloading the application.

9. The method of claim 1, wherein the stub application is embedded in at least one of the device, a SIM card, and a removable smart card.

10. The method of claim 1, wherein the activate message is encrypted using the credentials and the step of verifying the activate message includes decrypting the activate message using a key based on the credentials.

11. The method of claim 1 comprising:
constructing the activate message;
encrypting the activate message using a key based on the credentials; and
sending the encrypted activate message to the remotely managed mobile wireless device.

12. The method of claim 11, wherein the message is sent using a short messaging service (SMS).

13. The method of claim 8 comprising de-activating the stub application if the device management client application is on the remotely managed mobile wireless device.

14. The method of claim 1 comprising:
installing the device management client application on the remotely managed mobile wireless device; and
de-activating the stub application.

15. The method of claim 1, wherein the credentials include a service provider signature and an identifier uniquely associated with the remotely managed mobile wireless device.

* * * * *